United States Patent [19]

McKeighen et al.

[11] 4,173,007
[45] Oct. 30, 1979

[54] DYNAMICALLY VARIABLE ELECTRONIC DELAY LINES FOR REAL TIME ULTRASONIC IMAGING SYSTEMS

[75] Inventors: Ronald E. McKeighen, Hoffman Estates; Michael P. Buchin, Schaumburg, both of Ill.

[73] Assignee: G. D. Searle & Co., Skokie, Ill.

[21] Appl. No.: 812,109

[22] Filed: Jul. 1, 1977

[51] Int. Cl.² .............................................. G01S 9/66
[52] U.S. Cl. ....................................... 367/11; 73/625; 73/609
[58] Field of Search ................................ 340/1 R, 6 R; 343/100 SA; 73/609, 625, 628, 629

[56] References Cited

U.S. PATENT DOCUMENTS

| | | | |
|---|---|---|---|
| 3,449,711 | 6/1969 | Ricketts, Jr. et al. | 340/6 R |
| 3,918,024 | 11/1975 | Macovski | 340/1 R |
| 4,019,169 | 4/1977 | Takamizawa | 340/1 R |
| 4,031,501 | 6/1977 | Caruso | 340/6 R |
| 4,058,003 | 11/1977 | Macovski | 73/609 |

*Primary Examiner*—Richard A. Farley
*Attorney, Agent, or Firm*—Dennis O. Kraft; Roy A. Ekstrand

[57] ABSTRACT

A dynamically variable electronic delay line for real time ultrasonic imaging systems is disclosed so as to controllably phase the signals associated with an array of electro-mechanical transducer elements and thereby enable the selective scanning and dynamic focusing of a target. A controllable variable electronic time delay apparatus is coupled to each of the electromechanical transducer elements of the array and in one embodiment thereof constitutes an electronic memory having separate write-in and read-out addressing capabilities. The signals associated with a respective ultrasonic transducer element are fed in at selected write-in addresses and subsequently read-out and extracted after an initial time delay interval. The write-in and read-out address pointers of the memory are continuously sequenced during operation of the device and the time delay interval is a function of the difference between the addresses, as well as the clock rate. The initial delay can be varied by instantaneously modifying either the write-in or the read-out address pointer during the sequencing thereof, such modification being defined as an "edit-splice" technique. In other embodiments of the invention, the time delay apparatus could comprise a multiple cell memory or register in which a plurality of signals from an associated transducer element are stored and subsequently read-out after an initial time delay, which delay can be changed either by varying the effective length of the shift register or by varying the clock rate at which the shift register advances the signals stored therein, or through an "edit-splice" technique as above-described.

10 Claims, 12 Drawing Figures

DYNAMICALLY VARIABLE ELECTRONIC DELAY LINES FOR REAL TIME ULTRASONIC IMAGING SYSTEMS

BACKGROUND OF THE INVENTION

This invention generally relates to ultrasonic imaging systems and is particularly concerned with the provision of a dynamically variable electronic delay line for real time ultrasonic imaging by which the signals associated with an array of electro-mechanical acoustic transducer elements are controllably phased to thereby enable the selective scanning and dynamic focusing of a target.

In an ultrasonic imaging system of the type wherein a plurality of transmitting and receiving electro-mechanical transducer elements are disposed in an array, the scanning angle and focal distance for the acoustic signals both transmitted and received by the transducer elements can be selected by carefully controlling the timing of the signals associated with each transducer element, to the end that the acoustic pulses transmitted from each of the transducer elements of an array all arrive at the same time at a particular target disposed at a particular scanning angle and focal distance, and such that the return or "echo" signals received by each of the transducer elements are properly phased so as to be processed i.e. coherently summed, at the same time.

More specifically, and with initial reference to FIG. 1 of the appended drawings, a typical phased-array of electro-mechanical transducer elements could comprise elements 1 thru 5, each physically spaced-apart, one from the other, by a selected linear distance. Each of the electro-mechanical acoustic transducer elements 1 thru 5 serve to convert an electronic pulse signal presented thereto into an acoustic pulse and transmit same. Similarly, the return acoustic "echo" pulses received by each of the electro-mechanical transducer elements 1 thru 5 would be reconverted into electrical pulses for processing and ultimate image display. If it is desired, for example, to focus upon a remote target disposed at some angle $\theta$ such as indicated by reference numeral 6, it would be necessary that each of the acoustic pulses transmitted by the plurality of transducer elements 1 thru 5 arrive at the location of the remote target 6 at the same time. In this respect, it is clear that the acoustic pulses transmitted from transducer elements 2 thru 5 would have to travel a respectively increased distance represented by reference designations L2 thru L5, respectively, as compared with the acoustic pulse transmitted from acoustic transducer element 1, for example. In that the speed of the acoustic pulses travelling within the medium between the transducer elements and the remote target 6 is known, by creating a time delay between the transmission of the acoustic pulses from each of the respective transducers, time synchronism of all transmitted pulses at the remote target 6 can be assured. For example, the additional distance L5 that the acoustic pulse from transducer element 5 would have to travel can be compensated for, as contrasted with the acoustic pulse from transducer element 1, by causing the pulse transmitted by transducer element 5 to occur at a certain time interval T5 prior to the transmission of the acoustic pulse from transducer element 1.

When receiving "echo" signals that have been reflected from the target 6, similar time-delay considerations would apply. Specifically, since the signal received by transducer element 5 would be received at a time interval T5 subsequent to the receipt of the signal by transducer element 1 due to the additional distance L5 that such signal would have to travel, it would be necessary to shift or delay the signal at transducer element 1 through a time delay T5 so as to assure coherence, i.e. coincidence or proper phasing of such signal at transducer element 1 with the signal at transducer element 5. Similar considerations apply with respect to each of the signals from transducer elements 2, 3, and 4, for example, to the end that all signals received are placed into time coincidence, one with the other, for subsequent processing in accordance with conventional techniques.

As should be apparent, by altering the relative time delays of both transmission and receipt of signals at each of the respective transducer elements 1 thru 5, in effect a change in the scanning angle $\theta$ can be obtained. The acoustic beam transmitted and received by the plurality of transducer elements in the array can therefore be swept or steered through any desired sector, without the necessity of mechanical movement of the transducer elements per se.

In addition to the capabilities of sweeping an ultrasonic beam, a phased array of transducer elements is also required to selectively focus the beam at any desired focal distance. For example, and with reference now to FIG. 2 of the application drawings, a phased linear array of electro-mechanical transducer elements 1 thru 5 are again depicted, the array being desired in this instance to selectively focus on any given one of the remote objects or target reflectors 8 thru 18, these remote targets being disposed at varying distances from the linear array along the normal to such array in this instance.

As shown in FIG. 2, the first signal received by the array of transducer elements 1 thru 5 is that which is reflected from target 8, target 8 being at a first distance from the line of the array. The second signal received by the array of transducer elements would be that which was reflected from remote target 10, for example, and so-on, through remote target 18, each target being at a ever-increasing focal distance from the line of the array. The signals received by each of the transducer elements 1 thru 5 from the respective remote target reflectors 8 thru 18 are illustrated by the pulses as shown, with the first-received pulse such as would be obtained from the reflection from target reflector 8, for example, being that pulse to the far right-hand side of the pulse series representation, and with the last pulse received by each transducer element 1 thru 5, such as from target reflector 18, for example, being the sixth pulse, or the pulse represented at the far left-hand side of the pulse series representation for each transducer.

It is evident from these illustrations that to focus upon signals received from a target reflector 8 at the given focal distance of same, the first pulse received by transducer element 3 would have to be delayed in time for a certain interval, and the first pulse received by transducer elements 2 and 4, for example, would have to be delayed in time a somewhat shorter time interval, to the end that the first received pulse from each of the transducer elements 1 thru 5 would be in time coincidence with one another, or properly phased. The time corrections necessary to focus or phase the signals received from the different focal distances of the various target reflectors 10 thru 18 would similarly have to be adjusted, one with respect to the other, so that the second signal received by each of the transducer elements, such as that which would be reflected from target 10, would all be in time coincidence with one another for subsequent processing, and such that the third signal received by all of the transducer elements from target reflector 12 at its given focal distance would similarly be in time coincidence or proper phase with one another for subsequent processing.

In effect, the schematic illustration of FIG. 2 depicts a situation by which so-called dynamic focusing at different distances during a series of pulses are obtained, with the first pulse received being from target reflector 8, and with the last pulse received being from target reflector 18, and with the entire string of echoes respectively received by each of the transducer elements being represented by the pulse series as shown. An interesting observation can be made in this example by noting that the data vectors $D_1$ and $D_5$, while being the same length as one another due to the placement of the target reflectors along the normal to the linear transducer element array, are shorter than the data vector $D_3$ representing the pulse series received by transducer element 3. The proper amount of time delay must be introduced into each channel represented by the transducer elements 1 thru 5 so that each respective corresponding echo or pulse signal in each channel are lined-up with one another. Such proper "phasing" in a dynamic focusing mode can be obtained by either effectively shortening data vector $D_3$ to match the length of data vectors $D_1$ and $D_5$, or by alternatively stretching the data vectors $D_1$ and $D_5$ to line up with the data vector $D_3$. Similar considerations, of course, would apply to the data vectors associated with transducer elements 2 and 4.

The first step in lining up the received signals would be to bring the first-received signal in each data channel from the target reflector closest to the array into time coincidence with one another. As is noted from the illustration, to achieve such coincidence, for the first received signals from each transducer element, a relatively long delay would be required as between transducer elements 3 and 5, or 1 and 3, with an incrementally lesser initial delay being necessary as between transducer elements 2 and 3, or 3 and 4.

Once these first-received signals are placed into time coincidence, the amount of the initial delay provided in each of the respective channels must then be repeatedly trimmed in small increments so as to bring into proper focus the subsequently received echo signals for such channel, i.e. so as to achieve a true dynamic focus or zoom lens effect. For example, the delay necessary to bring into time coincidence the second-received signals such as from target reflector 10 would not be the identical delay that was required to bring into time coincidence the first-received signals from echo reflector 8 due to the different distance of travel of the signals. Accordingly, if a given initial delay were selected for each of the respective data channels associated with each of the respective transducer elements so as to properly focus the first-received signals, this delay must then be incrementally changed by a small amount for each of the subsequently received signals so as to dynamically focus on each of the target objects in sequential order. At the ultrasonic frequencies of interest as are typically used in ultrasonic imaging environments, and considering that it is desirable to focus to an accuracy of ¼ of a wave length or less, a suitable delay mechanism must provide incremental delay changes as short as 100 nanoseconds, and also be capable of providing initial delays as long as twelve microseconds.

In practice, the selection of the scanning or sweeping angles, as well as the selection of the focusing distances as above-discussed are achieved through the placement of a controllable variable delay line in each of the data channels associated with each respective transducer element of an array, as is depicted in FIG. 3 of the application drawings, for example. As has been shown, the proper selection of the time delay values for each of the respective delays, and the proper switching or incrementing of such delay values for each of the received pulses, readily brings-about the control of beam angle and focal length in an imaging system. This control over the time delay interval of each time delay element is effected through well-known control means so that the pulse signals received from each of the transducer elements 1 thru 5 are each respectively in phase with one another, for subsequent processing in a processor 22, and ultimate image display in a display apparatus 24 as is known.

Numerous difficulties are encountered, however, in attempting to implement the requisite delay specifications through the use of switched analog delay lines as are typically provided in prior art systems. Such switched analog delay lines resulted in portions of the signals being inserted out of sequence, a process which leads to image artifacts in the display. Furthermore, the long lumped-constant delay lines utilized in prior-art approaches are physically bulky, are quite expensive, and serve to introduce insertion losses, phase distortion, and timing inaccuracies.

Thus, while the theoretical basis of real time ultrasonic imaging is known, practical problems in the provision of delay elements capable of the high requirements imposed have inhibited the diagnostic use of such imaging with the attendant beam steering and dynamic focusing of a fixed ultrasonic transducer array.

SUMMARY OF THE INVENTION

It is thus apparent that a need exists in the ultrasonic imaging art for a dynamically variable electronic delay line which overcomes the problems associated with the switchable analog delay lines of the prior-art, and enables real time ultrasonic imaging. It is the primary objective of the instant invention to provide such a dynamically variable electronic delay line.

This objective, as well as many others which will become apparent as the description proceeds, are implemented by the subject invention which comprises a dynamically variable electronic delay line for real time ultrasonic imaging systems so as to controllably phase the signals associated with an array of electro-mechanical transducer elements and thereby enable the selective scanning and dynamic focusing of a target. A controllable variable electronic time delay apparatus is coupled to each of the electromechanical transducer elements of the array and in one embodiment thereof constitutes an electronic memory having separate write-in and read-out addressing capabilities. The signals associated with a respective ultrasonic transducer element are fed in at selected write-in addresses and subsequently read-out and after an initial time delay interval. The write-in and read-out address pointers of the memory are continuously sequenced during operation of the device, and the time delay interval is a function of the difference between the addresses, as well as the clock rate. The initial delay can be varied by instantaneously modifying either the write-in or the read-out address pointers during the sequencing thereof, such modification being defined as an "edit-splice" technique. In other embodiments of the invention, the time delay apparatus could comprise a multiple cell memory or register in which a plurality of signals from an associated transducer element are stored and subsequently read-out after an initial time delay, which delay can be changed either by varying the effective length of the shift register, or by varying the clock rate at which the shift register advances the signals stored therein, or through an "edit-splice" technique as above-discussed.

BRIEF DESCRIPTION OF THE DRAWINGS

The invention itself will become better understood and further features and advantages thereof will become apparent from the following detailed description of preferred inventive embodiments, which description refers to the appended sheets of drawings, wherein.

DETAILED DESCRIPTION OF THE DRAWINGS

Figure 1:
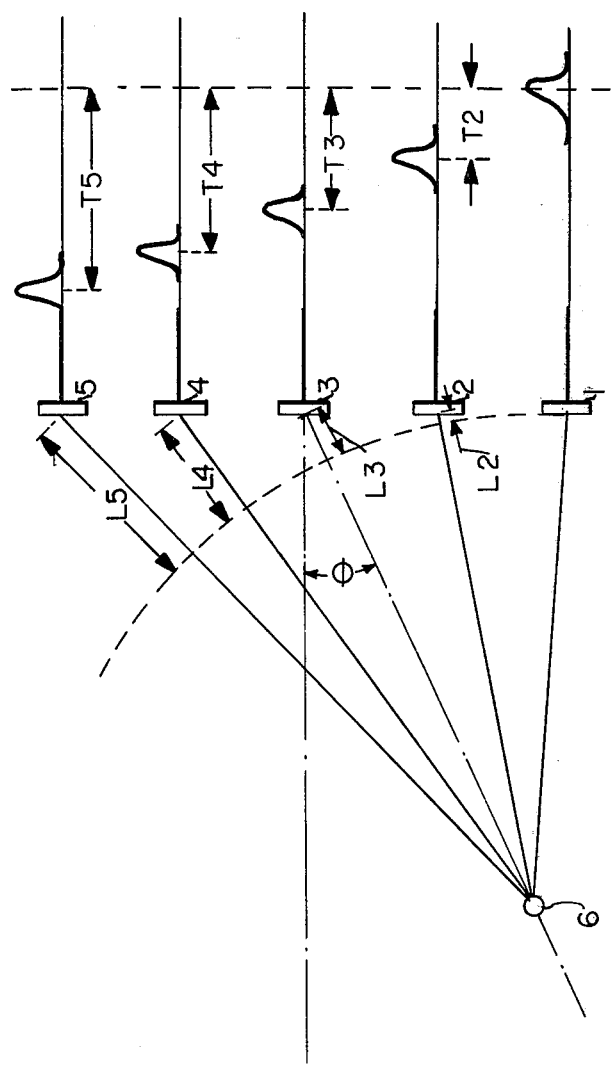
FIG. 1 is a diagramatic illustration of the principle of beam steering in association with an array of electro-mechanical acoustic transducer elements.
Figure 2:
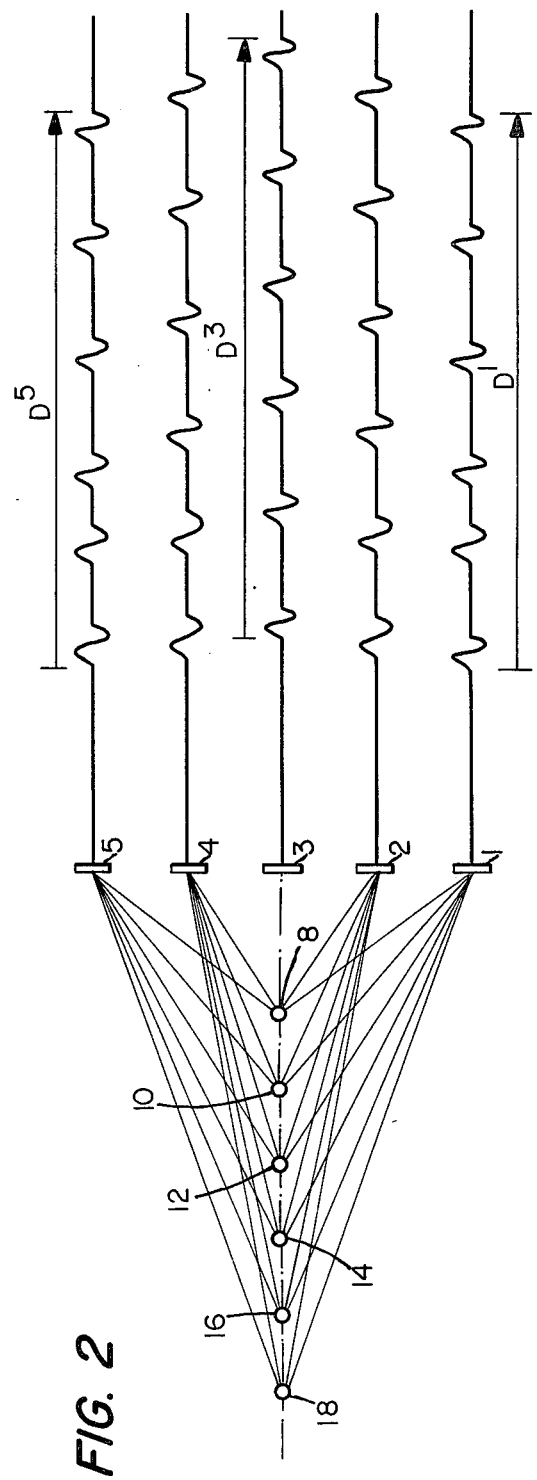
FIG. 2 is a diagramatic illustration of the principle of dynamic focusing of the beam associated with an array of electro-mechanical acoustic transducer elements.
Figure 3:
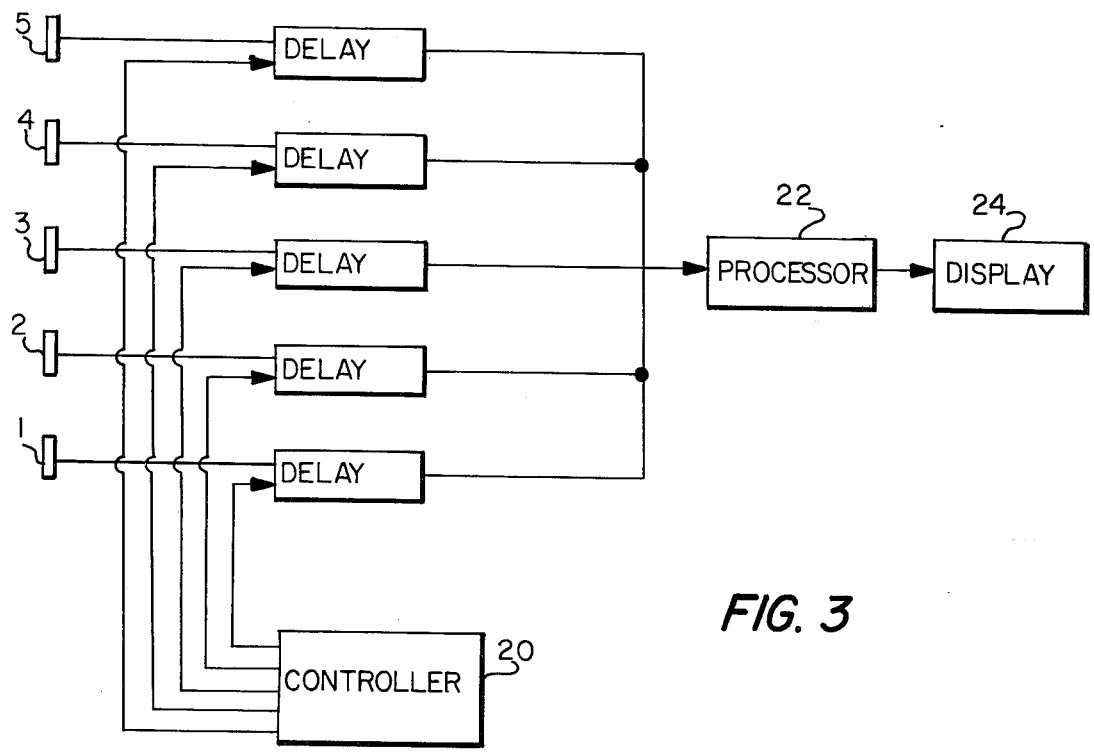
FIG. 3 is an electrical schematic illustration of a phased array of ultrasonic electro-mechanical acoustic transducer elements depicting the utilization of independent, controllable variable delay elements in association with each data channel or transducer.

With reference now to the drawings, the instant invention will be seen to comprise a controllable, variable electronic memory mechanism which is contemplated to be utilized as the delay element of an ultrasonic imaging system of the type depicted in FIG. 3 of the application drawings.

Figure 4A:
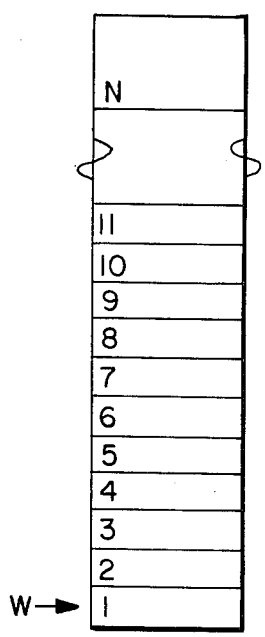
FIGS. 4A thru 4C schematically depict the operation of a sequentially addressable electronic digital memory apparatus in accordance with the technique of the instant invention, such electronic memory being shown with independent and simultaneously accessible write-in and read-out ports.
Figure 4B:
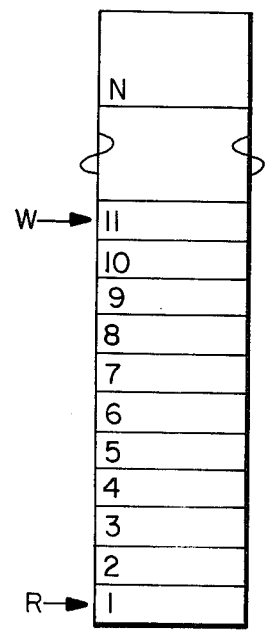
Figure 4C:
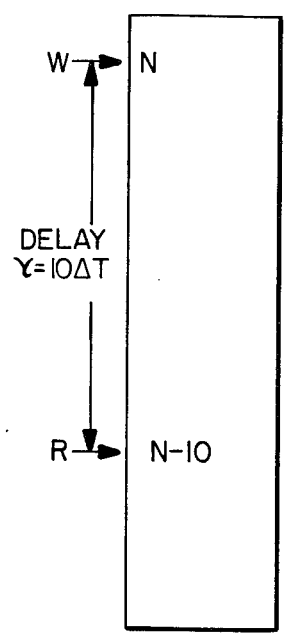

With particular reference to FIGS. 4A thru 4C of the application drawings, one technique for generating an electronic delay line is depicted, this technique involving the temporary storage of digital data in a buffer memory, so as to be read-out at a later time and thus create a time delay. As is shown, the device of each of FIGS. 4A thru 4C is contemplated to comprise an addressable electronic memory integrated circuit apparatus having separate write-in and read-out addressing capabilities and a plurality of storage positions or cells. Data constituting the echo pulses, for example, received by an electro-mechanical acoustic transducer element would be inputted into the memory stack at a selected write-in address. Initially, for example, the data could be entered at address position 1 as is shown. The write-in address of the memory device would be sequenced to the next higher number at a given clock rate, for example, which could comprise 10 Megahertz at the ultrasound frequencies of interest. Thus, each new data pulse would be entered sequentially up the memory stack at sequentially increasing storage positions, at the clock rate.

If it was desired to generate a time delay of one microsecond, then in the instance under consideration herein, and when the write-in address reached level 11 on the memory stack or device as is depicted in FIG. 4B, the stored data would begin to be read-out of the device at a read-out address 1 as shown. From that point on, both the write-in and the read-out addresses would sequence up the memory stack simultaneously together, maintaining the ten position difference therebetween so that all data written in would automatically be read out at a read-out address ten positions behind the write-in address which, in accordance with a presupposed clock rate, would generate the one microsecond delay. This is illustrated in FIG. 4 of the application drawings, wherein the delay $Y = 10 \, \Delta T$, wherein $\Delta T$ is the clock period.

When the top of the memory device or stack was reached, bearing in mind that the number of memory positions of the integrated circuit is necessarily limited, the write pointer or address would "scroll over" to the bottom of the stack, i.e. to address position 1, wherein it would continue to sequence up the stack. Similarly, when the read-out address pointer reached the top of the stack, such address would "scroll over" to begin anew at the bottom of the memory stack, or address position 1, and from that position continue its upward sequencing.

If it is desired to focus to a new target distance, or sweep to a different beam direction angle, it is necessary that the delay generated by the memory device of FIGS. 4A thru 4C be altered. For example, let it be assumed that upon the reception of a suitable control signal, it is desired that subsequent data entering the memory device receive a 1.2 microsecond delay, instead of the 1 microsecond delay previously discussed. This delay can readily be implemented in the following exemplary manner.

Upon receipt of the control signal requesting an additional delay, the current address of the write pointer could be arithmetically incremented by two, and a new address value reassigned to it. Alternatively, one could incrementally delay or freeze the value of the read-out address by marking time of such address for two clock cycles, then release such address so that the read-out address can sequentially advance up the stack. In either event, the data read-out by the read-out address pointer would have experienced a delay of 1.2 microseconds as with respect to the new data being written-in, instead of the 1 microsecond delay previously discussed.

Depending on whether the middle transducer, or one of the end transducers of a transducer array is chosen as a reference point, it can be appreciated that the delays required for implementing a zoom focus or dynamic focus, for example, could be obtained with either totally incrementing changes or totally decrementing changes. Decrementing changes, with the utilization of external controlling circuitry, may be obtained by the marking time of the clock controlling the write-in address sequencing, or incrementing the read-out address pointer. Freezing the read-out address serves to increase the instantaneous time delay, in dependence upon the number of clock pulses lost. Freezing the write-in address serves to shorten the delay from its original preselected value, again in accordance with the number of clock cycles lost. Lastly, and as can be appreciated, changes in the incremental time delay could also be effected by varying the clock rate.

The generalized technique as above-described in accordance with FIGS. 4A thru 4C merely requires the provision of an addressable electronic memory means which has separate write-in and read-out addressing. The time delay technique of the instant invention can be implemented with either a RAM digital memory or a serial analog memory such as the SAM-64 available from Reticon or the Fairchild CCD 321. Ideally, the digital RAM memory constitutes the preferred approach and such memory should either have simultaneous read/write addressing capabilities, or be able to achieve a sequential read/write operation, all within the basic system clock periods. Integrated circuit registers are readily commercially available having simultaneous read/write ports but such registers as are currently available have relatively few memory cells, requiring a large number of individual chips. Accordingly, the instant invention contemplates a construction of memory registers which effectively performs the novel time delay technique discussed with respect to FIGS. 4A thru 4C, but does so in a fashion utilizing more commonly available memory devices, such as the Schottky TTL RAM's of 256×4 chips, having 50 nanosecond read or write capability.

Figure 5A:
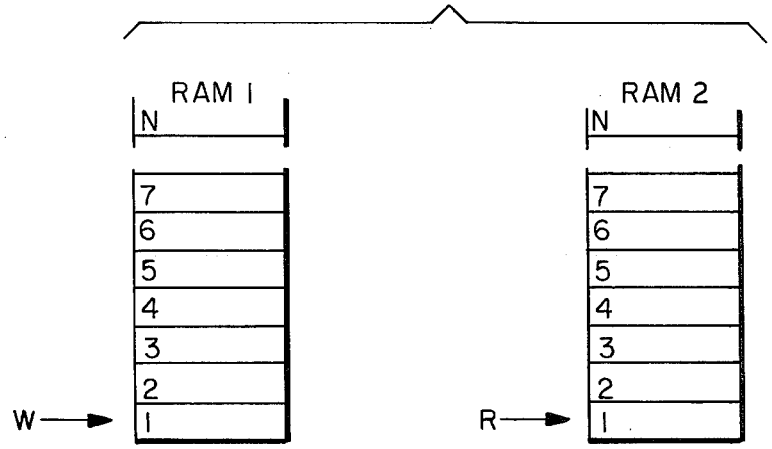
FIGS. 5A thru 5C schematically depict the operation of a sequentially addressable electronic memory means constructed in accordance with an inventive variant, to achieve high speed simultaneous write-in and read-out capabilities of different forms of memory chips.
Figure 5B:
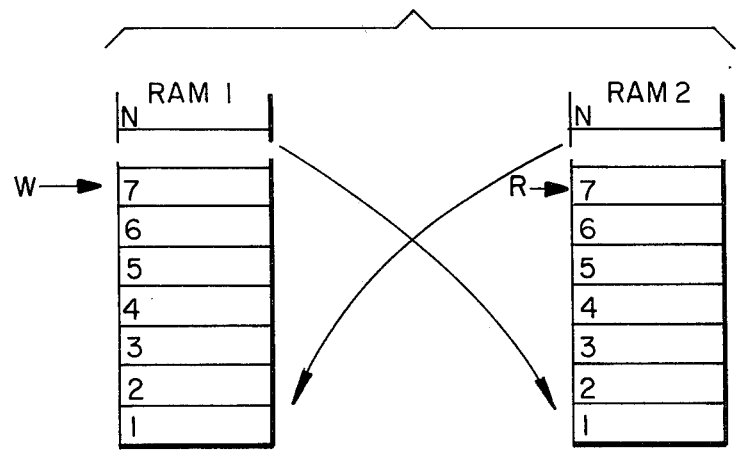
Figure 5C:
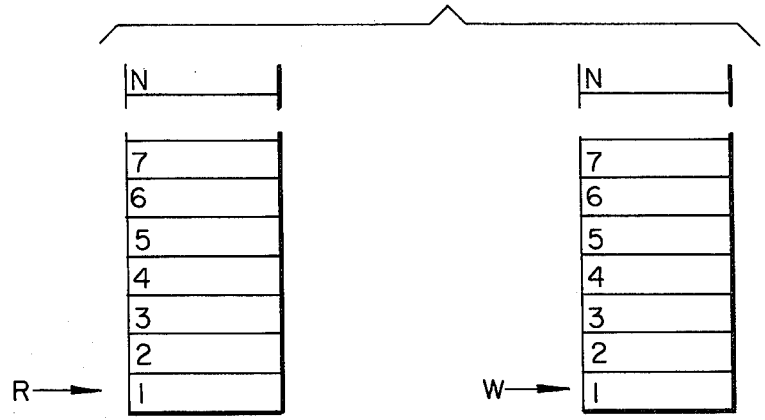

In this respect, and with reference to FIGS. 5A thru 5C of the application drawings, two duplicate digital memory stacks of the RAM variety are shown, these memories or buffers being utilized in a ping-pong multiplexing scheme to effectively allow simultaneous read and write operations and permit data sampling rates of up to 15-20 MHz. Specifically, one of the memory stacks is utilized for reading-out data, and the other of the memory stacks is utilized for writing-in data. The roles of each of the two memory stacks are periodically interchanged corresponding to the delay interval required.

For example, and with reference to FIG. 5A of the application drawings, the first memory stack identified as RAM 1 has a write-in address at address level one, whereas the second memory indicated by RAM 2 has its read-out address at address level one. The write-in address of RAM 1 and the read-out address of RAM 2 respectively advance up the memory stacks in accordance with a given clock rate. When the address pointers are at a height corresponding to the delay requested, the pointers automatically reset to address level one, except that the roles of the read and write pointers would be interchanged.

With specific reference to FIG. 5B of the application drawings, for example, and assuming a required delay of 7 clock cycles, when the write-in address of RAM 1 reached the seventh level, at which time the read-out address of RAM 2 would similarly be at the seventh level, the write-in pointer would be automatically returned by external circuitry of the first address level of RAM 2. Similarly, the read pointer of RAM 2 would be automatically "scrolled over" to the first address level of RAM 1. This is indicated in FIG. 5C.

This process of sequencing up through each successive address position or level and then scrolling over and interchanging the read/write roles of each respective memory continues until a modification in the time delay is called for by an external control signal. To decrement a delay, the write pointer or address W is temporarily held or frozen at the same position for the requisite number of clock cycles. Similarly, to increment a delay, the read pointer or address R is temporarily held at the same position for the requisite number of clock cycles. This is in accord with the general principle of the instant invention as was discussed with respect to FIGS. 4A thru 4C, although in this instance, the read/write address pointers would not advance all the way to the top of the memory stack before scrollover, but only to a height or level corresponding to the required delay interval.

Figure 6:
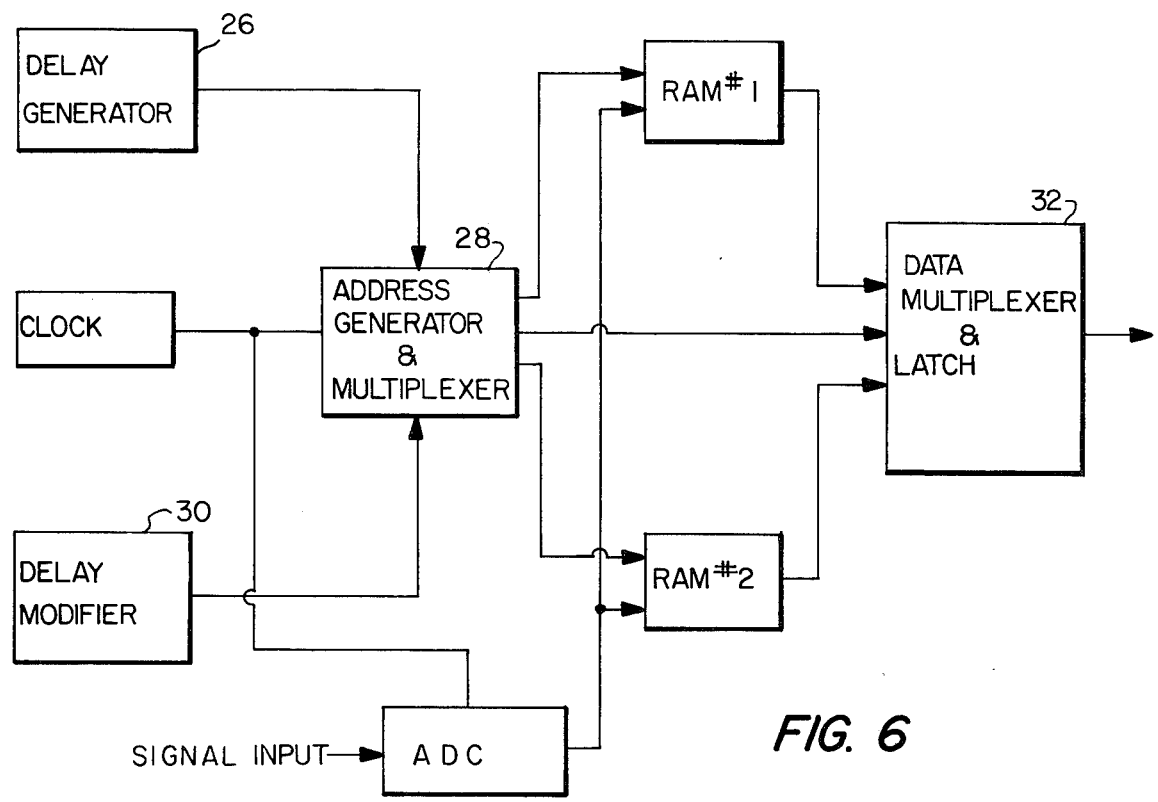
FIG. 6 is an electrical schematic representation of the circuit apparatus utilized to control and select the variable time delay achieved by an electronic digital memory device of the type depicted in FIGS. 5A thru 5C.

Reference is now made to FIG. 6 of the application drawings in which a typical embodiment of a digital delay line constructed in accordance with the teachings of the instant invention is depicted, such digital delay line utilizing the dual RAM digital memory devices in the particular fashion discussed with respect to FIGS. 5A thru 5C. The control means or controller 20 of the generalized embodiment of FIG. 3 is, in this instance, comprised of a delay generator 26, an address generator and multiplexer 28, and a delay modifier 30. Under the control of signals generated by the delay generator 26, the address generator 28 causes the read and write inputs of each of the RAM memories to sequentially index up the respective memory stacks through the various memory levels or positions in accordance with an external non-illustrated clock. The delay generator 26 further serves to fix the maximum level or address position within each memory stack, at which point the read/write pointers of the respective memories scroll over or are interchanged to the first memory or address position in the respective other memory stack, as was discussed as concerns FIGS. 5B and 5C. To this end, the address generator 28 also provides the so-called "multiplexing" function.

When an incremental change in the initially selected time delay is required, a signal is generated by the delay modifier 30 to the address generator 28, causing either the read address or the write address of the respective RAM memories to "mark time" through a given selected number of clock cycles. In accordance with the techniques discussed concerning the generalized embodiments of FIGS. 4A thru 4C and FIGS. 5A thru 5C, an incremental variation in the time delay would thereby occur. The output from the memories then would be fed through a data multiplexer 32 which would be sequenced in accordance with the multiplex or "scrollover" signals from address generator 28, which data multiplexer 32 also would contain a data latching or holding mechanism to accomodate the possible occurrence of a scrollover or address interchange between the memories taking place during a delay modification procedure. Of course, the signals inputted into each of the memories RAM 1 and RAM 2 would first be passed from each transducer element through an analog-to-digital converter. The output from the data multiplexer and latch then would be passed through a processor and display such as indicated by Reference Nos. 22 and 24 in FIG. 3 of the application drawings, for example. Each of the elements constituting controller 20 as above-described are of conventional construction.

Figure 7:
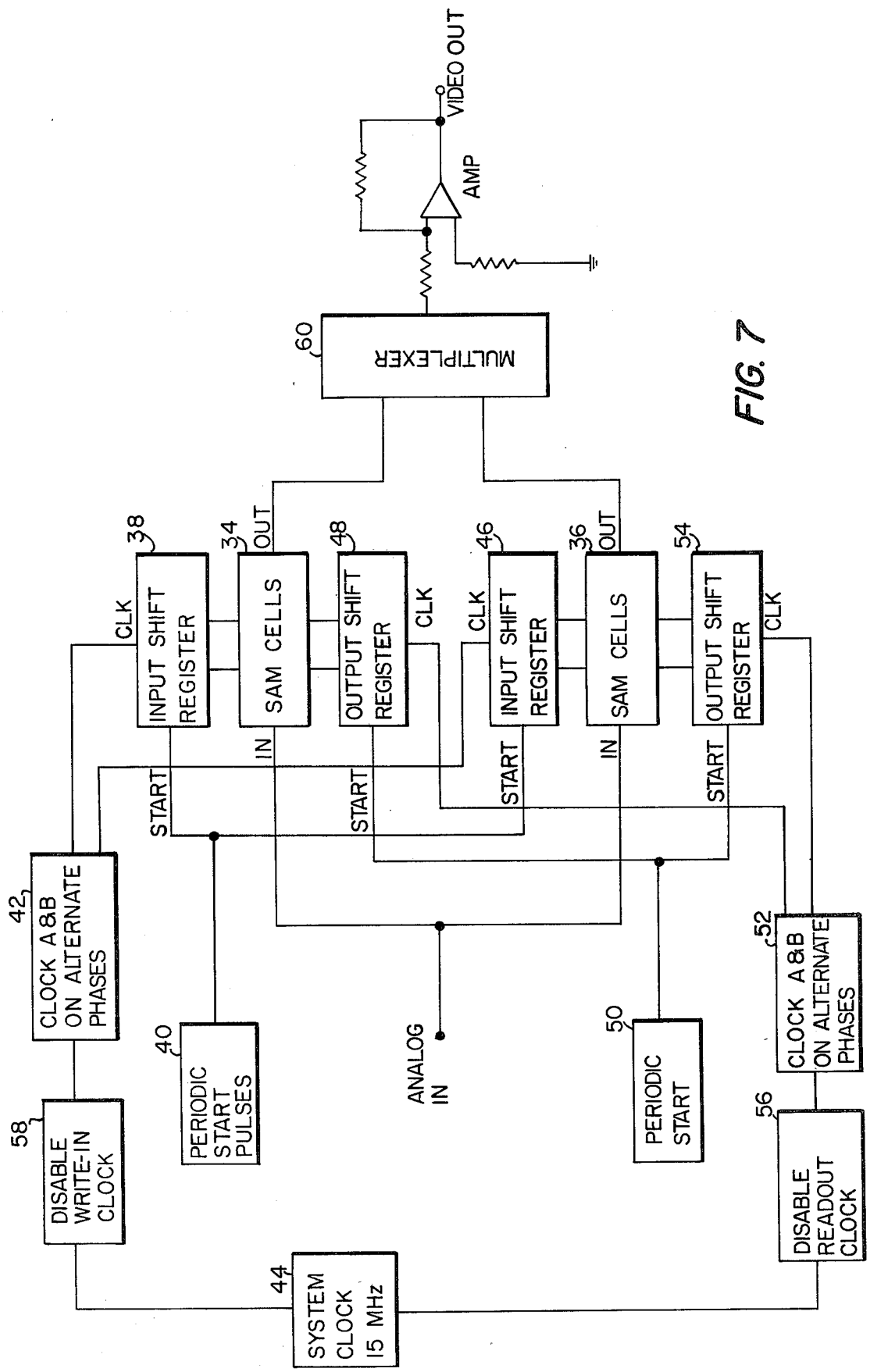
FIG. 7 is an electrical schematic representation of a further variant of the instant invention wherein variable electronic delays can be achieved through the utilization of analog memory devices, still without the attendant disadvantages of the prior-art.

As briefly explained at the outset, the delay techniques of the instant invention can also be implemented by utilizing sequentially addressable analog memories as are conventionally available, such as the Reticon SAM-64 or Fairchild CCD 321 analog memory devices, thus eliminating the necessity of analog-to-digital converters as utilized with the digital memory embodiment. Reference is made to FIG. 7 of the application drawings which depicts an embodiment of the invention utilizing sequentially addressable analog memories and following the general techniques discussed with respect to FIGS. 5A thru 5C of the application drawings.

The analog signal, without being converted to digitized form, obtained from each of the electro-mechanical acoustic transducer elements is fed into two sequentially addressable analog memories 34 and 36 which, as indicated, are coupled for multiplexing in parallel. The input position or write-in address of memory 34 is determined by an input shift register 38 started by periodic start pulses 40 and sequenced by the write-in clock 42 in a fashion such that the write-in address sequentially advances through the various memory cells or positions in accordance with a system clock 44. Similarly, the write-in address of memory 36 is controlled by a shift register 46 which is started by start pulses 40 and sequentially advanced through various address levels under control of clock 42 at the system clock rate. Clock 42 serves to advance the write-in address of memory 34 and the write-in address of memory 36 on alternate phases.

The read-out address or position of memory 34 is controlled by the shift register 48 which is started by start pulses 50 and sequenced by a read-out clock 52 under control of the system clock 44. Similarly, the sequencing of the read-out address of memory 36 is controlled by shift register 54 which, again, is started by start pulses 50 under control of clock 52 at the system clock rate, clock 52 serving to advance shift registers 54 and 48 during alternate phases.

Initially, the write-in address of memory 34, for example, would be advanced through a number of sequential positions or levels in accordance with the system clock rate 44 so as to define some initial delay. After the initial delay has been defined, the read-out address of memory 34 would commence its sequential advance due to the generation of a start pulse 50 to the output shift register 54 under control of clock 52. The sequential advance of the write-in position of memory 34 and the sequential advance of the read-out position or address of memory 34 would continue throughout one phase, typically delimited by the memory capacity of each of the units. When such phase terminates, the position of the write pointer of memory unit 34 and subsequently, after some predetermined initial delay, the position of the read pointer or address of memory unit 34 return to the first level in the same memory unit and continues. It can be appreciated that memory 36 will operate in an identical manner but shifted in time by ½ of a clock period by virtue of the 180° phase shift between clocks A and B. Thus, the outputs of memories 34 and 36 can be interleaved during opposing ½ cycles. In this manner, effective signal sampling at twice the basic clock frequency A or B is achieved.

If an incremental change in the time delay is then desired, the read-out clock 52 would be temporarily disabled through circuit means 56, thus stopping the advance of the read-out shift registers 54 or 48. Alternatively, and depending upon the direction of the delay to be implemented, the write-in clock 42 could be disabled by circuit means 58 provided therefor to thus cause the write-in address to "mark time".

The signals outputted from the memories 34 and 36 would be outputted in an alternating fashion depending upon the particular phase of operation. Thus, a multiplexer 60 is provided, similar to the provision of multiplexer 32 with respect to the embodiment of the invention depicted in FIG. 6, the output from multiplexer 60 then being amplified as is conventional, for ultimate video display.

Another practical digital method of generating variable time delays of data which has first been passed through an analog-to-digital converter is through the utilization of a conventional first-in first-out (FIFO) memory device. Initially, data would be entered into the FIFO memory under control of the input clock. The read-out clock would be inhibited through a given number of cycles so as to establish an initial time delay, which would then be maintained. By subsequently freezing or marking time with the input clock or the read-out clock following the previously discussed "edit-splice" techniques, a decrement or increment respectively, can be effected in the time delay. Alternatively, the clocking rate for either or both the input and read-out clocks of the FIFO device can be varied. Non-linear delay functions can readily be achieved.

Figure 8:
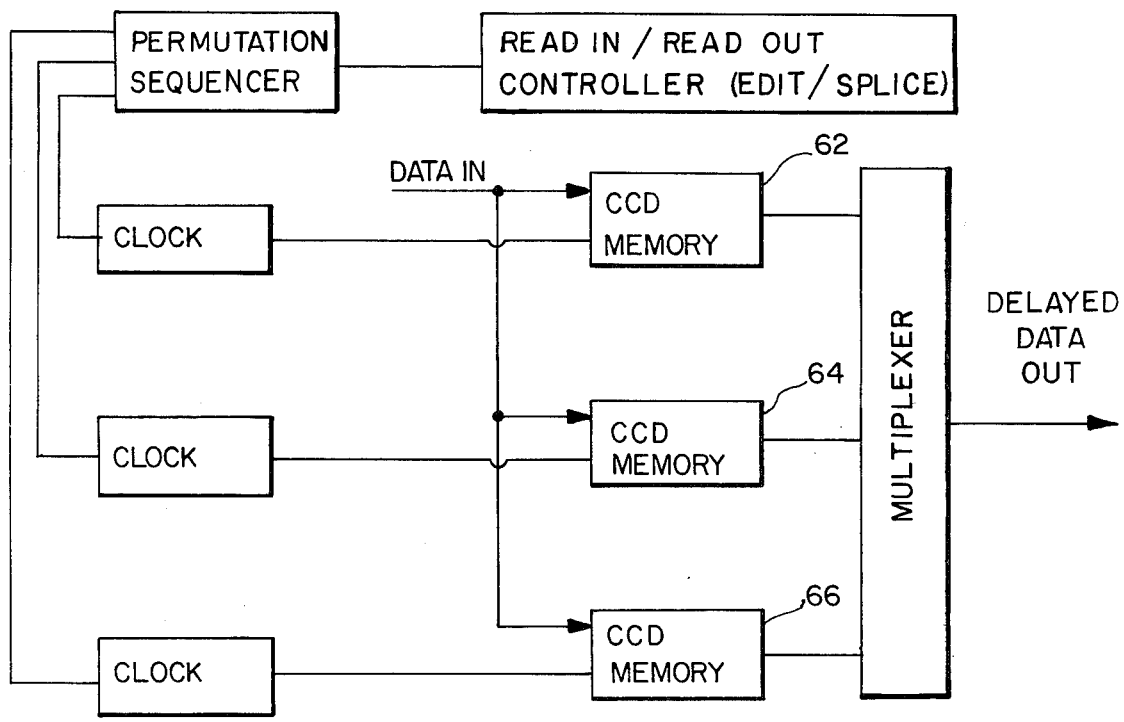
FIG. 8 is an electrical schematic illustration of still another variant of the instant invention wherein a variable electronic delay line for an ultrasonic imaging system is obtained from the utilization of permutated CCD memory devices.

As still another variation, permutating serial-access CCD memories could be utilized in the fashion shown in FIG. 8. Here, CCD Memory 62 would initially be loaded with data. After an initial time delay, the memory would be read out under the control of the associated clock. Meanwhile, subsequent data would be input to memory 64. By the time that memory 62 was clocked out memory 64 would be filled, and the data input would be transferred to memory 66 while memory 64 was read out. This cycle would repeat as between the memory registers. Incremental time delays would be implemented either by varying the clock rates (both clock in and clock out rates could potentially be varied to achieve complex non-linear sweep functions), or by utilizing the "edit-splice" techniques and momentarily disabling selective ones of the clocks.

Still another approach contemplates that an entire line of data could be loaded into one relatively long shift register, with the incoming data being periodically deleted in various ones of the data channels. In other words, data from an entire line of sight, i.e. a plurality of echo pulses from a respective transducer, could be close packed into a single register, one for each channel, such that the corresponding echoes in each channel line up for subsequent readout. These packed data bits would then be read out and summed or otherwise processed while the next line of echoes was packed into a duplicate set of registers.

The Techniques as above-described are effective to generate a time delay for the ultrasonic signal pulses of considerable length, but without the disadvantageous features of the prior-art. Furthermore, the time delay so selected can be incremented in small intervals to assure an incremental accuracy corresponding to the clock period. For example, at a typical clock rate of 15 MHz, the digital delay techniques as described can give timing precision of approximately 67 nanoseconds. Increased precision may be obtained by passing the digital signals that have been delayed by means described above through an additional tapped digital delay line whose delay value is digitally programmable. Active digital delay lines which provide taps every one or two nanoseconds are commercially available and well-known. Conversely, added precision could be gained by passing an analog-data signal through a programmable tapped analog-delay line of prior-art construction, such delay line being disposed ahead of the analog-to-digital convertor associated with the digital delay schemes as described. In this fashion, the digital delay technique of the instant invention could be construed as constituting a "coarse" adjustment mechanism, whereas the tapped digital-delay line, or the programmable tapped analog-delay line, would provide "fine tuning" effects.

It should now be apparent that the objectives set forth at the outset of this Specification have been successfully achieved. Accordingly,

What is claimed is:

1. In an ultrasonic imaging system of the type wherein a plurality of transmitting and receiving electro-mechanical transducer elements are disposed in an array with variable time delay apparatus being associated with the respective transducer elements to controllably phase the signals thereby enabling the selective scanning and dynamic focusing of a target, the improvement wherein said variable time delay apparatus comprises: an electronic memory means, into which memory means the signals from the associated transducer element are inputted at selected write-in addresses and subsequently outputted after an initial time delay time interval; control means for modifying the time interval between signal input and signal output to thereby vary the time delay of said memory means; and means for sequencing at least one of the selected write-in and output address positions of said memory means in accordance with a known clock rate, and wherein said control means modifies at least one of said write-in and output address positions during the sequencing thereof to a new address thereby altering the interval between said write-in and output addresses and thus the time delay of said memory means.

2. An ultrasonic imaging system as defined in claim 1, wherein said control means momentarily holds constant the instantanous address of at least one of said write-in and output address positions during the sequencing thereof to alter the interval therebetween.

3. An ultrasonic imaging system as defined in claim 1, wherein said memory means comprises a storage circuit having a plurality of discrete memory storage positions with simultaneous write-in and read-out accessing, and logic circuit means coupled thereto such that said addresses each sequentially and repetitively advance from the first to the last of said plurality of storage positions and then scroll over to the first storage position.

4. An ultrasonic imaging system as defined in claim 1, wherein said memory means comprises two storage circuits each having a plurality of discrete memory storage positions with each storage circuit being accessible by one only of a write-in address or a read-out address, and logic circuit means coupled to each storage circuit such that the respective write-in and read-out addresses of each storage circuit sequentially and repetitively advance from the first to a specified value of said respective plurality of storage positions, and then scroll over to the first storage position of the respective other storage circuit.

5. An ultrasonic imaging system as defined in claim 1, wherein said memory means comprises a digital random access memory.

6. An ultrasonic imaging system as defined in claim 1, wherein said memory means comprises an analog memory.

7. An ultrasonic imaging system as defined in claim 1, further including a separate programmable digital delay line coupled to each memory means, and means to incrementally tap said delay line, whereby gross phasing is achieved by said memory means with fine adjustments to said phasing being effected by said delay line.

8. An ultrasonic imaging system as defined in claim 2 wherein said memory means comprises a digital random access memory.

9. An ultrasonic imaging system as defined in claim 2 further including a separate programmable digital delay line coupled to each memory means, and means to incrementally tap said delay line, whereby gross phasing is achieved by said memory means with fine adjustments to said phasing being effected by said delay line.

10. In an ultrasonic imaging system of the type wherein a plurality of transmitting and receiving electromechanical transducer elements are disposed in an array with variable time delay apparatus being associated with the respective transducer elements to controllably phase the signals thereby enabling the selective scanning and dynamic focusing of a target, the improvement wherein said variable time delay apparatus comprises: a plurality of electronic memory means each of which comprise a multiple cell register into which register a plurality of signals from the associated transducer element corresponding to echo signals from one transmitted pulse are inputted at selected write-in addresses and stored; and circuit means for causing said stored signals to be outputted from said registers after a selected time delay so as to be in phase coincidence and for maintaining said phase coincidence by sequencing at least one of the selected write-in and output address positions of said memory means in accordance with a known clock rate, and wherein said circuit means modifies at least one of said write-in and output address positions during the sequencing thereof to a new address thereby altering the interval between said write-in and output addresses and thus the time delay of said memory means.

* * * * *